US 6,612,748 B1

(12) United States Patent
Funatsu et al.

(10) Patent No.: US 6,612,748 B1
(45) Date of Patent: Sep. 2, 2003

(54) BALL BEARING

(75) Inventors: Masayuki Funatsu, Osaka (JP);
Masahiro Mukasa, Nara-ken (JP);
Shinji Abe, Nara-ken (JP)

(73) Assignee: Koyo Seiko Co., Ltd. (JP)

( * ) Notice: Subject to any disclaimer, the term of this patent is extended or adjusted under 35 U.S.C. 154(b) by 0 days.

(21) Appl. No.: 09/587,023

(22) Filed: Jun. 5, 2000

(30) Foreign Application Priority Data

Jun. 8, 1999 (JP) .............................. 11-197934

(51) Int. Cl.⁷ ............................... F16C 33/38
(52) U.S. Cl. ....................................... 384/531
(58) Field of Search .................. 384/531, 532, 384/534, 527, 523

(56) References Cited

U.S. PATENT DOCUMENTS 4,702,627 A * 10/1987 Pollastro

FOREIGN PATENT DOCUMENTS

JP 02-85013 7/1990
JP 06-28345 4/1994

* cited by examiner

Primary Examiner—Lenard A. Footland
(74) Attorney, Agent, or Firm—Adams & Wilks

(57) ABSTRACT

A ball bearing has an outer race, an inner race, and a retainer disposed between the outer race and the inner race. The retainer comprises an annular member having a first annular surface and a second annular surface disposed opposite the first annular surface, a plurality of annularly spaced pockets formed in the first annular surface of the annular member, and a plurality of annular spaced fingers each having inner and outer surfaces and projecting generally axially from the first annular surface of the annular member so that the pockets are disposed between adjacent inner surfaces of respective ones of the pairs of fingers, the first annular surface of the annular member having external and internal edges and a plurality of surface portions each disposed between adjacent outer surfaces of respective ones of the pairs of fingers and inclined toward the second annular surface of the annular member from the external edge to the internal edge. Balls are disposed in respective ones of the pockets of the annular member and coact with the outer and inner races.

21 Claims, 3 Drawing Sheets

BALL BEARING

BACKGROUND OF THE INVENTION

1. Field of the Invention

The present invention relates to a ball bearing having a crown-shaped retainer made of synthetic resin, and more particularly to a ball bearing with a crown-shaped synthetic resin retainer (hereinafter, retainer) for supporting a spindle used for a device necessary for spinning, such as a spindle motor of a hard disc drive (HDD in general).

2. Background Information

Generally, a ball bearing has an annular configuration and comprises an inner race, an outer race, a plurality of balls fitted between the inner and outer races, and a retainer arranged between the inner and outer races and having a plurality of pockets for retaining the balls. The retainer comprises an annulus, pockets formed on one of the annular surfaces of the annulus, and a plurality of fingers or pawls formed at opposite sides of the pockets and axially projecting beyond the annular surface so as to prevent dropping out of the balls.

FIG. 6 is a cross-sectional view illustrating a conventional ball bearing as applied to, e.g., a HDD spindle. In the drawing, the ball bearing is partly enlarged for the purpose of indicating elements relating to the present invention.

Reference numerals 61, 62, 63, and 64 denote an inner race, an outer race, a ball, and a retainer, respectively in a ball bearing device. Furthermore, reference numeral 65 denotes an annulus which is of a flat surface. In the retainer 64, one of the annular surfaces 65a has a plurality of pockets 66. Each of the pockets 66 has a pair of pawls formed at opposite sides and project axially beyond the annular surface of the retainer 64. The pair of pawls 67 serve to prevent the dropping down of the respective balls 63. It will be understood that the annular surface 65a is formed in the shape of a flat surface between the pawls 67, whose surface is perpendicular to the axis. The pockets 66 are part-spherical or troidal-shaped such that each ball 63 is retained by a respective one of the pockets 66. The flat surface 65a serves to provide a predetermined amount of grease 68 so that the ball bearing is lubricated.

When the conventional retainer as above described was applied to a spindle motor for HDD, large quantities of grease 68 were scattered as the rotation of the ball bearing was increased. The scattered grease 68 was supplied to excess, because the released grease 68 was scattered toward the outer race 62 by the centrifugal force. As a result, this caused problems of increases in the resistance to agitation of grease and running torque. FIG. 7 is a cross sectional view showing a retainer for a ball bearing having an improved construction as compared to the retainer shown in FIG. 6. Such retainer is disclosed in Japanese Unexamined Utility Model Publication No. 2-85013. In the retainer for the ball bearing, there are provided protrusions 69 formed on the annular surface 65a of the annulus 65 between the rear faces of the pawls 67, respectively. The retainer 64 also has areas which are greased.

In the conventional retainer shown in FIG. 7, pawls 67 cannot effectively prevent the grease 68 from being scattered toward the outer race 62. However, it is difficult to set or coordinate an amount of grease to be supplied to the outer race 62. That is, if the grease is supplied to the outer race 62 in less quantities than required, the ball bearing will shorten its life because the outer race is not lubricated with grease.

SUMMARY OF THE INVENTION

In order to solve the above problems, the present invention is to provide, a ball bearing having an inner race, an outer race, a plurality of balls fitted between the inner and outer races at spaced equally intervals, and a retainer comprised of an annular member, a plurality of pockets formed by recessed openings on a first annular surface of the annular member, and a pair of fingers or pawls formed at opposite ends of the pockets and axially projecting beyond the first annular surface of the annular member. The first annular surface of the annular member has a surface portion formed in a slant which is inclined toward a second annular surface of the annular member from the external edge to the internal edge of the former.

In addition, the present invention is to provide an improved retainer by forming pawls which are of a thick wall along an outer curved line of the annular member and which are of a thin wall along an inner curved line of the annular member so that a space is tapered from the internal edge to the external edge of the annular surface between the back faces of the pawls.

According to the present invention, recesses for inserting a projected pin, which is utilized to stamp out or release the molded retainer from the die, enables a supply of a lubricant from the inner race to the outer race to be controlled.

DETAILED DESCRIPTION OF THE PREFERRED EMBODIMENTS

First Embodiment

Figure 1:
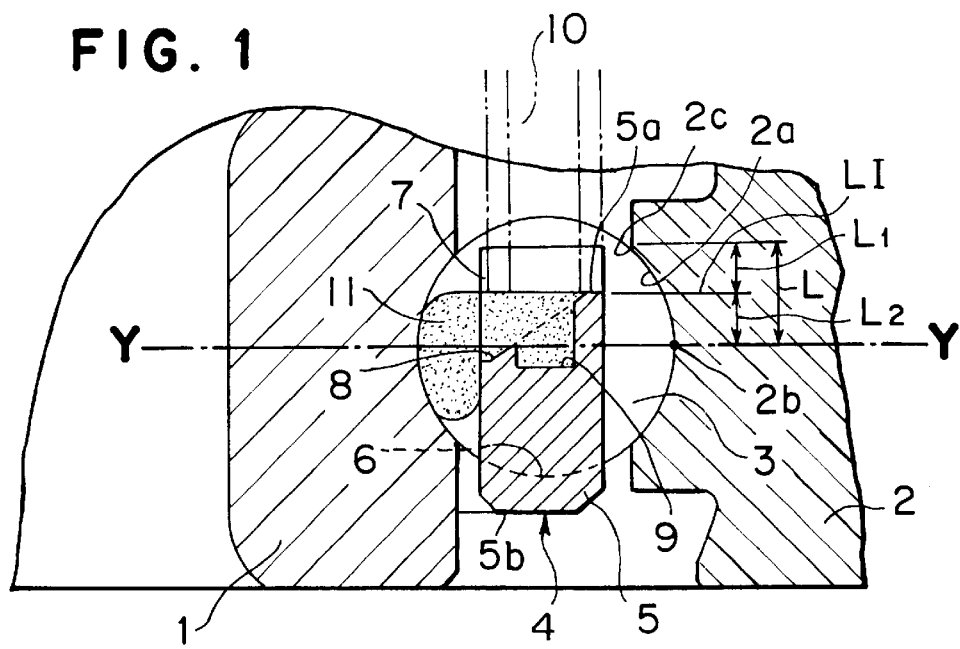
FIG. 1 is a cross sectional view illustrating a ball bearing of a first embodiment according to the present invention.

FIG. 1 is a cross sectional view illustrating a ball bearing according to a first embodiment, but showing in enlarged dimension the structures of which a ball is fitted between outer and inner races and a retainer is mounted between the outer and inner races for holding the ball therebetween.

Reference numerals 1, 2, 3, and 4 denote an inner race, an outer race, a ball fitted between the inner and outer races and a retainer, respectively. In the ball bearing shown in FIG. 1, a spindle (not shown) is fitted into a fitting hole of the inner race 1 in perpendicular relation with the radial line Y—Y passing through center of the ball 3. In the retainer 4, reference numerals 5, 5a, 5b, 6 and 7 denote an annular member, a first annular surface of the annular member, a second annular surface of the annular member, a pocket formed on the annular surface 5a in spaced relation to each other, and pawls or fingers for preventing the balls 3 from dropping down, respectively.

Figure 2:
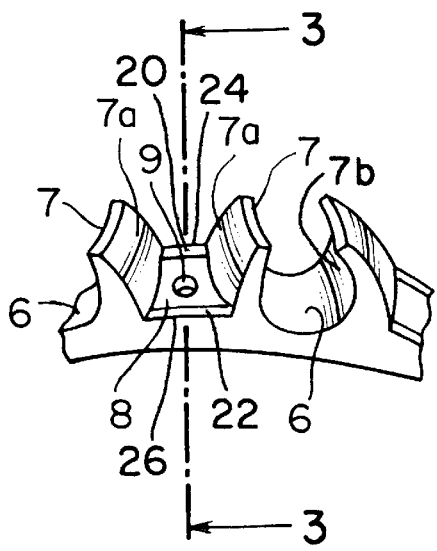
FIG. 2 is an oblique view illustrating a part of the crown-shaped synthetic resin retainer as shown in FIG. 1.
Figure 3:
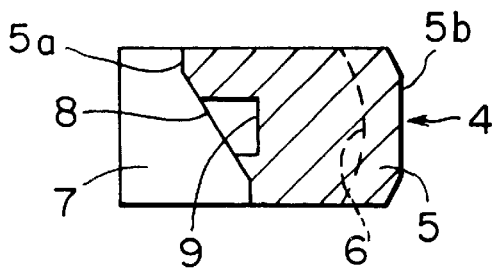
FIG. 3 is a cross-sectional view taken along line 3—3 in FIG. 2.

Referring to FIG. 1–3, the first annular surface 5a has surface portions 8 (hereinafter referred to as "slants") each formed between rear surfaces 7a of a respective pair of adjacent fingers 7. Each surface portion 8 extends between, flat surface portions 22, 23 and is inclined toward a second annular surface 5b of the annular member 5 from an external edge 24 to an internal edge 26 of the first annular surface 5a. The slant 8 serves to supply grease 11 gradually to the outer race 2 under the centrifugal force applied by the rotation of the ball bearing.

In the ball bearing, grease 11 is prelubricated in an oiler or feeding device 10 to be supplied therefrom to the slant 8. The oiler 10 is disposed at a general intermediate point LI of a length as indicated by the length L that is divided between lengths $L_1$, $L_2$. The length L is a distance of a line extending from a lowest part to each end of an orbital surface 2a of the outer race 2 in perpendicular to the radial line Y—Y which radially extends from the center of the ball 3.

The slant 8 is inclined toward the second annular surface 5b from the external edge 24 at the general intermediate point LI of the length L, preferably at an angle of 25 to 45 degrees with respect to the axis line Y—Y. If the slant 8 is inclined at an angle of under 25 degrees, the grease 11 is not kept well in the inner race 1 and is not suitably supplied to the outer race 2. On the contrary, if the slant 8 is inclined at an angle of over 45 degrees, the retainer 4 suffers from the disadvantage that its strength is lowered.

As shown in FIG. 1, according to the present invention, the slant 8 of the retainer 4 is inclined from the general intermediate point LI between a lowermost portion 2b and a leading end 2c of the orbital surface 2a. A linear distance between the lowermost portion 2b and the leading end 2c is denoted by L, which is the sum of the two equal distances $L_1$ and $L_2$ denoting the linear distances from the lowermost portion 2b, and the leading end 2c, respectively, to the intermediate point LI. Thus, the slant 8 will have effect of lowering the running torque and enabling to supply the grease 11 to the outer race 2.

Furthermore, it is noted that the slant 8 is formed with a recess 9. The recess 9 is utilized to stamp out or release a retainer from the die after the retainer has been produced by a molding process. However, the recess 9 also serves to control the flow of the grease 11 into the inner race 1 such that the grease 11 drops down from the oiler 10 into the recess 9, whereby the grease does not flow directly by force from.the slant 8 to the inner race 1. That is, the grease 11 flows out over the slant 8 and into the inner and outer races 1, 2 after the recess 9 is filled with the grease 11. Thus, when the bearing is rotated at high speed through a spindle (not shown), a flow of the grease 11 is controlled through the recess 9 so as to prevent large quantities of grease 11 from flowing to the outer race 1.

According to the retainer 4 of the present invention, the flow of the grease 11 is also controlled by the slant 8. Thus, large quantities of the grease 11 is not scattered over the outer race 2, but the grease 11 is supplied gradually into the outer race 2. As a result, the running torque of the ball bearing is not increased. The effectiveness in preventing the large quantities of the grease 11 from being scattered over the outer race is increased by the recess 9 acting as a grease holder.

Figure 8:
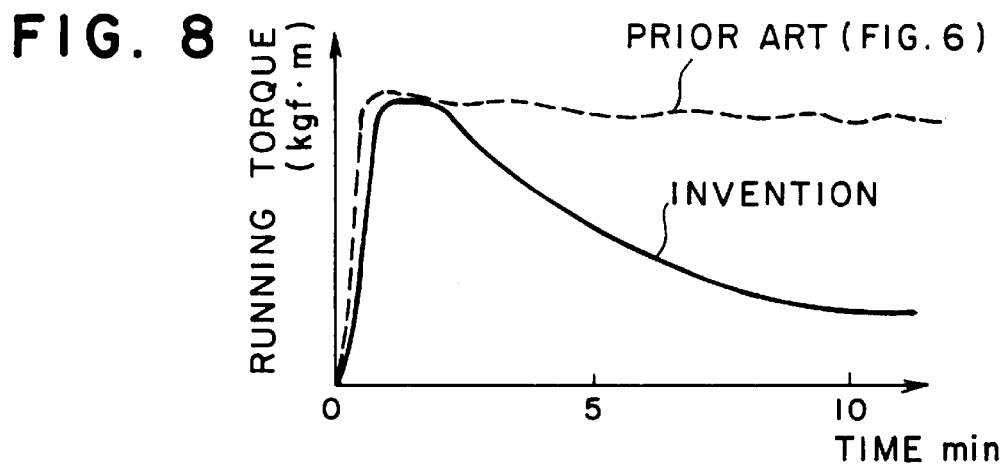
FIG. 8 is a graphical representation of elapsed time versus running torque comparing the ball bearing according to the present invention with the conventional ball bearing.

For a comparison of rotational torque for the ball bearing of the present invention with the conventional ball bearing, reference is made to the graph shown in FIG. 8. It will be found that the running torque is remarkably decreased over time.

Second Embodiment

Figure 4:
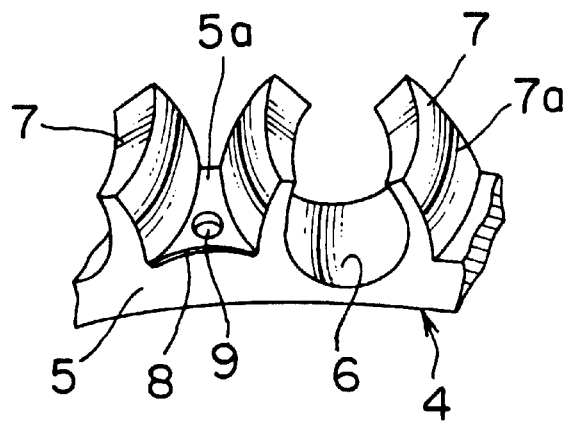
FIG. 4 is an oblique view illustrating a crown-shaped synthetic resin retainer of a second embodiment according to the present invention.
Figure 5:
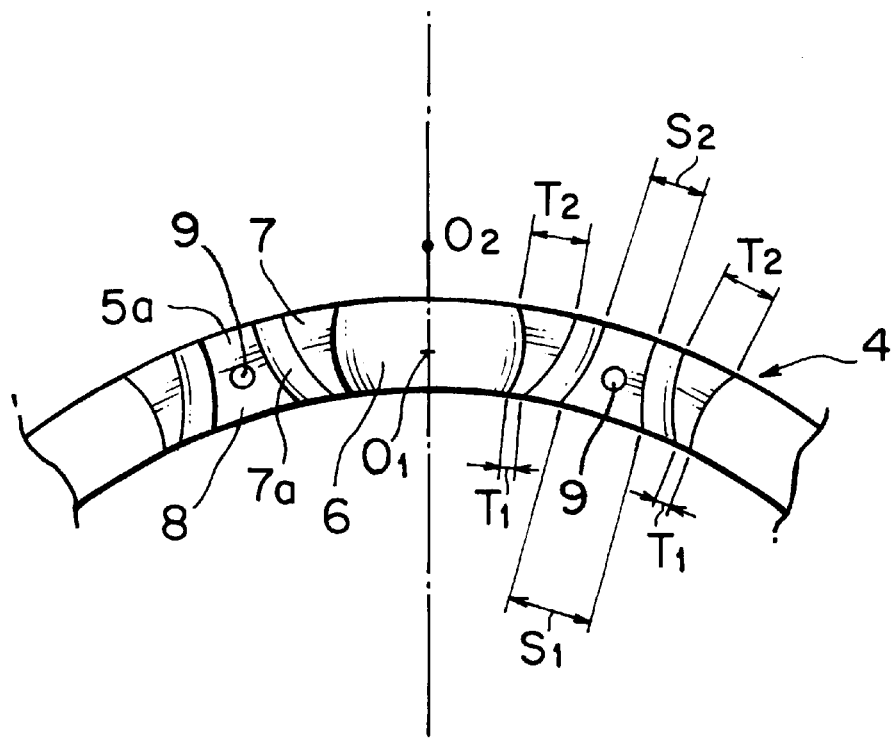
FIG. 5 is a plane view illustrating the crown-shaped synthetic resin retainer in FIG. 4.
Figure 6:
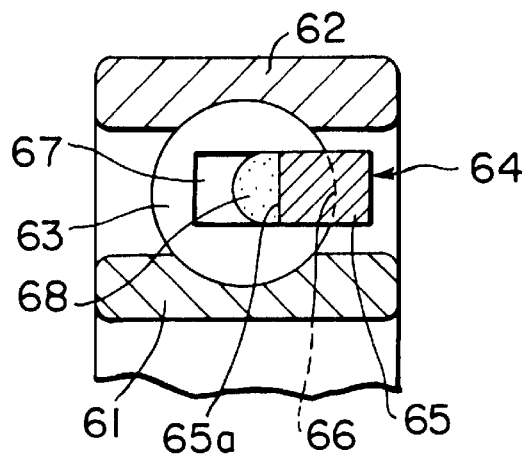
FIG. 6 is a cross sectional view illustrating a first conventional ball bearing.
Figure 7:
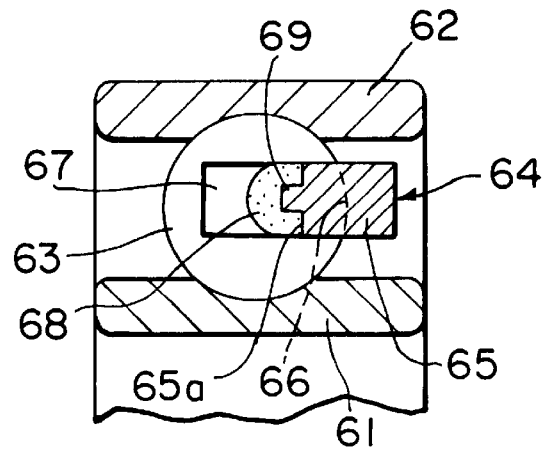
FIG. 7 is a cross sectional view illustrating a second conventional ball bearing.

FIGS. 4 and 5 are oblique and plane views, respectively, illustrating another embodiment of a retainer according to the present invention. The retainer has a construction basically similar to the retainer as shown in FIGS. 1–3. Accordingly, similar numbers are utilized in designating the corresponding portions of the retainer 4, and the overlapped parts of the descriptions are omitted.

In the retainer 4, back faces 7a of the respective pairs of fingers 7 for preventing the dropping of the balls are formed along a curved line having a center of curvature $O_2$ spaced outwardly from a center of the curvature $O_1$ of the pockets 6. Each of the fingers 7 is formed with a thin wall having a thickness $T_1$ on the side of the internal edge of the annular surface 5a, and with a thick wall having a thickness $T_2$ on the side of the external edge.of the annular surface 5a greater than the thickness $T_1$. Therefore, in the retainer 4, each of the slants 8 has a space $S_1$ between the back faces 7a of the fingers 7 on the side of the internal edge with respect to the annular surface 5a, and a space $S_2$ between the back faces 7a of the fingers 7 on the side of the external edge with respect to the annular surface 5a. Each of the spaces $S_1$ is larger than the spaces $S_2$. Thus, in the retainer 4, prevention of the scattering grease 11 over the outer race 2 and the strength of the fingers 7 are effectively increased. It should be understood that it is not limited to the composition disclosed therein in narrowing spaces between the back faces 7a of the projections 7 with respect to the external edge 24 of the annular surface 5a.

As above described, according to the present invention, the retainer has a plurality of slants each disposed between respective ones of the pairs of fingers and inclined toward the second annular surface from the external edge to the internal edge of the first annular surface of the annular member, whereby the retainer prevents large quantities of grease from scattering over the outer race by centrifugal force during rotation. As a result, the increase in the running torque of the ball bearing is prevented. In addition, the grease flows gradually toward the outer race by the centrifugal force in combination with the respective slants.

Moreover, in another embodiment, each finger has a thick wall portion on the side of the external edge of the first annular surface and narrowing the distance between the back faces of the pairs of fingers on the side of the external edge of the first annular surface relative to the wall on the side of the internal edge of the first annular surface. As a result, the strength of the retainer is increased, and the scatter of the grease is more effectively prevented.

What is claimed is:

1. A ball bearing comprising: an outer race; an inner race; a molded retainer disposed between the outer race and the inner race and comprised of an annular member having means for facilitating stamping out of the retainer from a die after molding of the retainer, a first annular surface and a second annular surface disposed opposite the first annular surface, a plurality of annularly spaced pockets formed in the first annular surface of the annular member, and a plurality of annular spaced fingers each having inner and outer surfaces and projecting generally axially from the first annular surface of the annular member so that each of the pockets is disposed between adjacent inner surfaces of respective ones of the pair fingers, the first annular surface of the annular member having external and internal edges and a plurality of surface portions each disposed between adjacent outer surfaces of respective ones of the pair of fingers and inclined toward the second annular surface of the annular member from the external edge to the internal edge; and a plurality of balls each disposed in respective ones of the pockets of the annular member and coacting with the outer and inner races.

2. A ball bearing apparatus comprising: a ball bearing according to claim 1; and a grease feeding device for feeding grease to the first annular surface of the annular member to lubricate the inner and outer races of the ball bearing.

3. A ball bearing according to claim 1; wherein each of the fingers extends from the external edge to the internal edge of the first annular surface of the annular member; and wherein a thickness of each of the fingers decreases from the external edge to the internal edge of the first annular surface so that a distance between the adjacent outer surfaces of respective ones of the pairs of fingers at the internal edge is greater than a distance between the adjacent outer surfaces of respective ones of the pairs of fingers at the external edge.

4. A ball bearing according to claim 1; wherein the annular member is generally crown-shaped.

5. A ball bearing according to claim 4; wherein the retainer is made of a synthetic resin.

6. A ball bearing according to claim 1; wherein the retainer is made of a synthetic resin.

7. A ball bearing according to claim 1; wherein the means for facilitating stamping out of the retainer comprises supply means for supplying grease from the first annular surface of the annular member to the outer race.

8. A ball bearing according to claim 7; wherein the supply means comprises a plurality of recesses each formed in respective ones of the inclined surface portions of the annular member.

9. A ball bearing according to claim 8; wherein the outer race has a plurality of orbital surfaces each for contacting a surface portion of respective ones of the balls; and wherein each of the surface portions of the first annular surface is inclined from an intermediate point of respective ones of the orbital surfaces of the outer race.

10. A ball bearing according to claim 8; wherein each of the surface portions of the first annular surface is inclined at an angle of from 25 to 45 degrees relative to an axis extending radially from a center of one of the balls.

11. A ball bearing according to claim 10; wherein each of the surface portions of the first annular surface is inclined at an angle of from 25 to 45 degrees relative to an axis extending radially from a center of one of the balls.

12. A ball bearing according to claim 1; wherein the means for facilitating stamping out of the retainer comprises a plurality of recesses each formed in respective ones of the inclined surface portions of the annular member.

13. A ball bearing according to claim 1; wherein the outer race has a plurality of orbital surfaces each for contacting a surface portion of a respective one of the balls; and wherein each of the surface portions of the first annular surface is inclined from an intermediate point of respective ones of the orbital surfaces of the outer race.

14. A ball bearing comprising: an outer race; an inner race; a retainer disposed between the outer race and the inner race and comprised of an annular member having a first annular surface and a second annular surface disposed opposite the first annular surface, a plurality of annularly spaced pockets formed in the first annular surface of the annular member, a plurality of annular spaced fingers each having inner and outer surfaces and projecting generally axially from the first annular surface of the annular member so that each of the pockets is disposed between adjacent inner surfaces of respective ones of the pair fingers, the first annular surface of the annular member having external and internal edges and a plurality of surface portions each disposed between adjacent outer surfaces of respective ones of the pair of fingers and inclined toward the second annular surface of the annular member from the external edge to the internal edge, and a plurality of recesses each formed in respective ones of the inclined surface portions; and a plurality of balls each disposed in respective ones of the pockets of the annular member and coacting with the outer and inner races.

15. A ball bearing according to claim 14; wherein the retainer of the ball bearing comprises a molded retainer; and wherein the recesses formed in the inclined surface portions of the retainer facilitate stamping out of the retainer from a die after molding of the retainer.

16. A ball bearing according to claim 14; wherein the annular member is generally crown-shaped.

17. A ball bearing according to claim 14; wherein the retainer is made of a synthetic resin.

18. A ball bearing according to claim 14; wherein each of the surface portions of the first annular surface is inclined at an angle of from 25 to 45 degrees relative to an axis extending radially from a center of one of the balls.

19. A ball bearing according to claim 14; wherein the outer race has a plurality of orbital surfaces each for contacting a surface portion of a respective one of the balls; and wherein each of the surface portions of the first annular surface is inclined from an intermediate point of respective ones of the orbital surfaces of the outer race.

20. A ball bearing according to claim 14; wherein the outer surface of each of the fingers extends along a curved line having a center of curvature spaced outwardly from a center of curvature of each of the pockets of the annular member.

21. A ball bearing apparatus comprising: a ball bearing according to claim 14; and a grease feeding device for feeding grease into the recesses of the retainer of the ball bearing to thereby control the flow of the grease into the inner and outer races of the ball bearing.

* * * * *